June 27, 1961  J. M. STRANG  2,989,889
RANGEFINDERS, AND LIKE OPTICAL INSTRUMENTS
Filed May 29, 1956  4 Sheets-Sheet 1
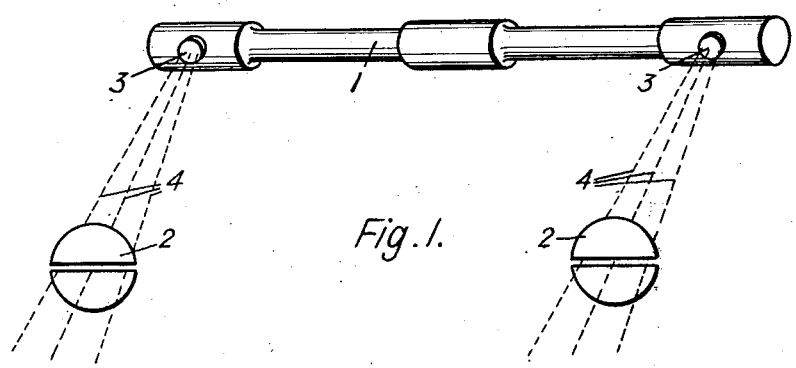
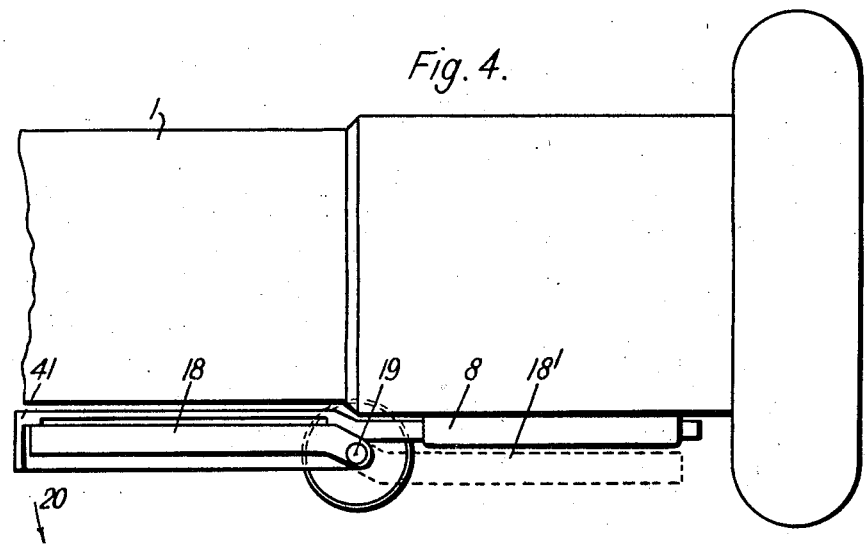
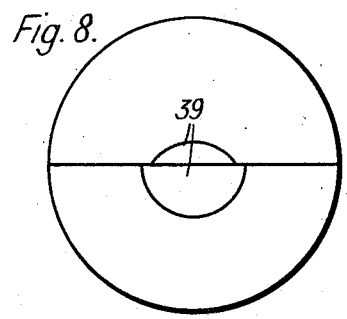
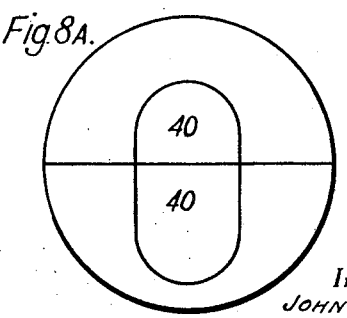
Inventor
JOHN MARTIN STRANG
By Young, Emery
& Thompson
Attorneys June 27, 1961  J. M. STRANG  2,989,889
RANGEFINDERS, AND LIKE OPTICAL INSTRUMENTS
Filed May 29, 1956  4 Sheets-Sheet 2
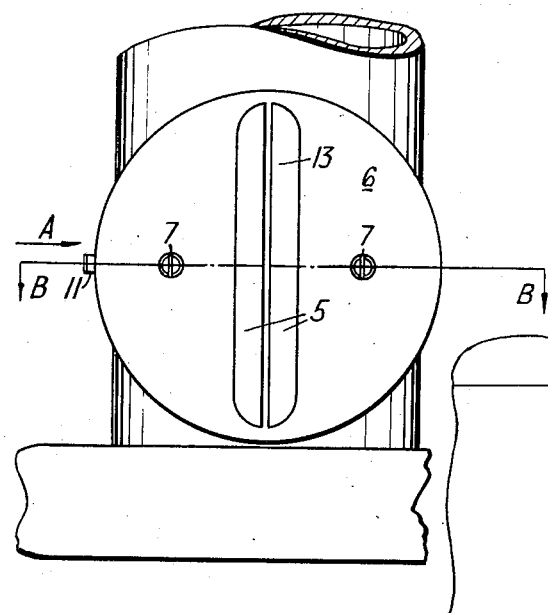
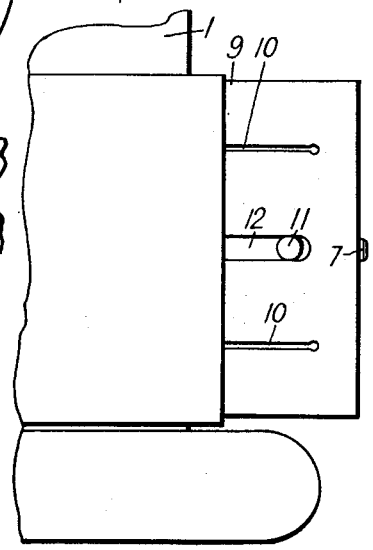
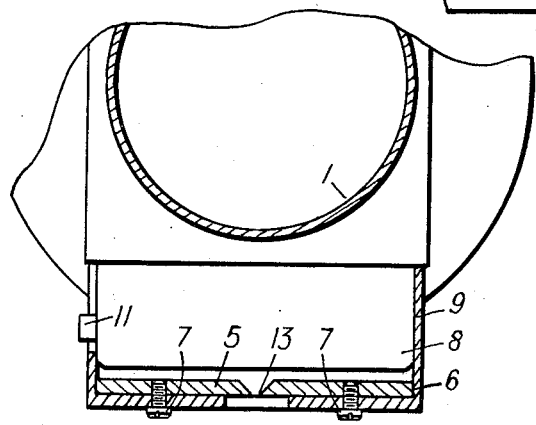
Inventor
JOHN MARTIN STRANG
By Young, Emery + Thompson
Attorneys June 27, 1961  J. M. STRANG  2,989,889
RANGEFINDERS, AND LIKE OPTICAL INSTRUMENTS
Filed May 29, 1956  4 Sheets-Sheet 4
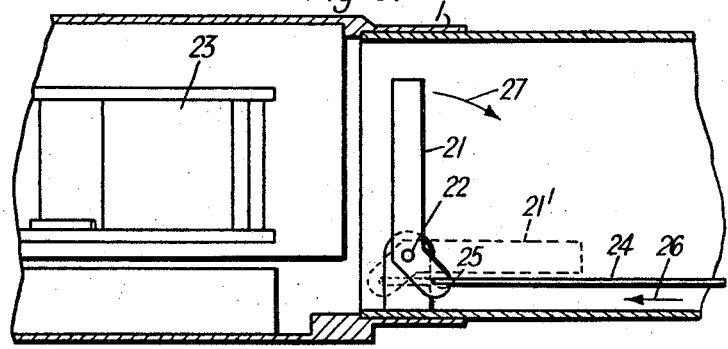
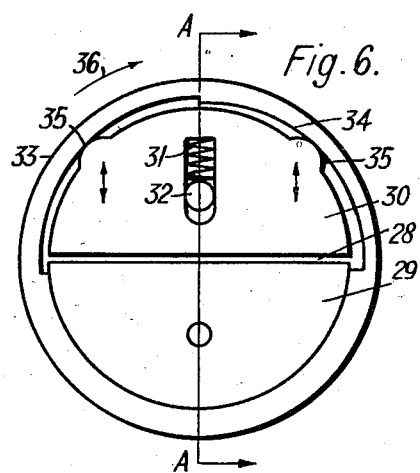
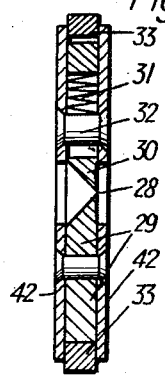
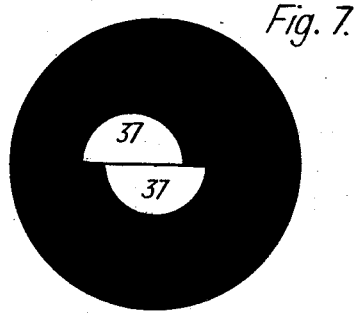
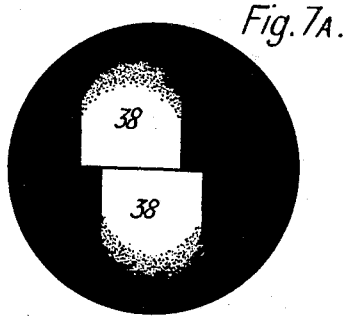
Inventor
JOHN MARTIN STRANG
By
Young, Emery & Thompson
Attorneys 2,989,889
RANGEFINDERS AND LIKE OPTICAL
INSTRUMENTS
John Martin Strang, Anniesland, Glasgow, Scotland, assignor to Barr and Stroud Limited, Anniesland, Glasgow, Scotland
Filed May 29, 1956, Ser. No. 587,992
Claims priority, application Great Britain June 30, 1955
7 Claims. (Cl. 88—2.6)

This invention relates to means for adjusting rangefinders, heightfinders, and like optical instruments for the measurement of angles utilising two incoming light beams (hereinafter and in the claims referred to generally as rangefinders) of the single observer self-contained base type, working on either the coincidence or the stereoscopic principle.

It is necessary for a rangefinder to be tested for scale reading from time to time and adjusted if required. Such testing may be made by observation on an object at a known distance or by observation on an object at an infinite distance, such as the moon, or a star or the sun. The present invention provides improved means for testing the rangefinder by observation on the sun.

One of the difficulties in observing on the sun with an instrument such as a rangefinder is that the lenses in the instrument act as burning glasses and may therefore cause damage to the eye of the observer or to parts of the instrument. Thus the temperature may easily rise to 150° C. or higher; this is harmful not only to the human eye, but inter alia to optical parts made up by glass components cemented together, and the cement may commence to soften about 70° C. For this reason it has been proposed to provide a dark screen in each of the light beams coming from the distant object to the rangefinder windows, such screen being coated with a very thin coating of metal, for example rhodium. The coating has to be of the correct thickness to permit a suitable amount of light to pass through and, as this thickness is very small, it is difficult to manufacture accurately. Further, it is difficult to avoid pin-holes in the metal coating which with use and the passage of time tend to enlarge and form greater holes. It is found in practice that as a result screens of this type require to be re-coated at frequent intervals.

Moreover, as the screens are inserted in the beams of light to the rangefinder, it is essential that the surfaces of each screen should be exactly parallel so as not to introduce a parallax error in the rangefinder. It is difficult and costly to make the surfaces of the screen sufficiently parallel.

The object of the present invention is to provide a screen which will be simple to make and yet effective in operation. It also has certain advantages in operation.

In accordance with the present invention, we provide a rangefinder of the type defined having in combination therewith for each of the two incoming light beams, light screening means which is substantially opaque but has a narrow, substantially parallel-sided slot therein, the width of the slot being sufficiently narrow to prevent passage of excessive heat when viewing directly at the sun. As a result while providing an entirely satisfactory image, the rise in temperature may be reduced to harmless levels or to negligible proportions.

More specifically according to the invention, we provide a rangefinder of the type defined having in combination therewith for each of the two incoming light beams, light screening means which is substantially opaque but has a narrow, substantially parallel-sided slot therein, and means for positioning said screening means in the paths of the two incoming light beams to screen against entrance of light into the rangefinder, and with said slots substantially parallel to the plane of triangulation of the rangefinder so that the taking of measurements is facilitated by elongation of image due to the effect of diffraction on the edges of the slots.

By disposing the narrow slots or slits parallel to (probably in) the plane of triangulation a new advantage is obtained owing to diffraction at the slots, the image of the sun in the field of view of the rangefinder being drawn out in the direction perpendicular to the slit. The image instead of being a circle becomes elongated into a band perpendicular to the plane of triangulation. This gives the best possible form of image for taking measurement of range.

Arising from the shape of the image referred to in the previous paragraph, a further advantage is that the "halving," that is the relative vertical adjustment of the two images, does not require to be so accurately adjusted. If the image of the sun is circular, as produced in the ordinary way, the slightest error in "halving" between the two images will produce a serious error in range setting in the case of a coincidence rangefinder. With the elongated images produced by the slits under the present invention, however, a considerable error in "halving" may occur without producing any error in range measurement.

Means may be provided for easily and quickly moving the screens into and out of the operative position so as to facilitate normal use of the rangefinder without the screens in the line of view. This means may consist of a mechanism whereby the position of the screens may be controlled by an operating lever situated conveniently for the rangetaker's hand.

While it is simplest to make the screens of completely opaque material, material having a substantial degree of opacity might be utilised, for example coloured glass, provided it screens sufficiently against the incoming light. The term "substantially opaque" as used herein and in the claims is intended to embrace such ranges of materials.

The slots may be of various lengths but preferably extend fully across the windows or objective lenses of the instrument. The slot width is small and it may effectively be very small, for example, one-thousandth of an inch or less. Thus good results have been obtained with a width estimated at one ten-thousandth of an inch (0.0001") but with such, dust may easily accumulate in the slot and result in a very poor image. Further, satisfactory results have been obtained with a width of fifteen thousands of and inch (0.015"); in this case the image is very bright and although the passage of heat is not excessive when viewing the sun directly, a light filter is required at the eyepiece. As the slot width is increased, the diffraction effect is reduced, until with a width of about twenty-five thousandths of an inch (0.025") the advantage due to diffraction is lost. Apart from this the width can, however, be increased until the passage of heat is excessive when viewing directly at the sun. In practice it has been found that one and a half thousandths of an inch (0.0015") is a good average dimension.

Means may be provided for adjusting the width of the slots in the screens so that the amount of light passing may be adjusted to the best condition at the time of measurement, and to suit the observer's wishes.

Preferably the screens are formed of opaque metal and can be swung into operative position and clamped therein for example by screw attachment, and can thus quickly be moved to an out-of-the-way position for normal use of the rangefinder. They may alternatively be clipped or attached into operative position and removed. In a modification each screen may be made in two parts which are brought towards each other to form the slot.

As a result of the invention the light and heat passing to the instrument, when adjusting on the sun, is limited, as required, and relatively clear definition of image in the vertical sense is provided for accuracy, while the screen can be inexpensively manufactured.

Embodiments of the invention will now be described by way of example with reference to the accompanying drawings, in which:

FIG. 1 is a diagrammatic view showing a rangefinder provided with a pair of slotted screens.

FIG. 2 is a fragmentary elevation of an end of a rangefinder having a window cap with a slotted screen.

FIG. 2A is a fragmentary view in the direction of arrow A of FIG. 2.

FIG. 2B is a sectional view on the line B—B of FIG. 2.

FIG. 4 is a fragmentary plan view of a rangefinder end having a pivotally-mounted slotted screen.

FIG. 5 is a fragmentary sectional elevation of a rangefinder having an internal pivotally-monted slotted screen.

FIG. 6 is an elevation of a screen having an adjustable slot.

FIG. 6A is a section on the line A—A of FIG. 6.

FIGS. 7 and 7A show images of the sun as seen through a rangefinder without and with slotted screens, respectively.

FIGS. 8 and 8A show the outlines of images of the sun as seen through a rangefinder without and with slotted screens, respectively.

Figure 3A:
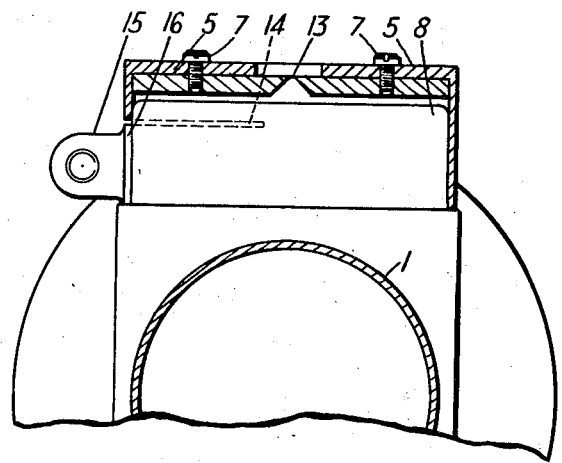
FIG. 3A is a fragmentary section on the line A—A of FIG. 3.

Referring to FIG. 1 of the drawings, the rangefinder 1 is provided with a pair of slotted screens 2 which cover the rangefinder window pieces 3. It will be apparent that the light 4 entering the windows 3 is very substantially reduced in quantity due to the presence of the slotted screens 2. Also, it will be noted that the slots in the screens 2 lie in the plane of triangulation of the rangefinder.

In FIGS. 2, 2A and 2B one form of screen is shown in greater detail. In this form the screen comprises a pair of knife-edged metal plates 5 attached to a metal end cap 6 by means of screws 7. The end cap 6 fits onto the window piece 8 of the rangefinder 1 and is held in place frictionally by the integral skirt portion 9. Slots 10 give resilience to the skirt portion. The cap is positioned at the window by means of a pin 11 fixed to the window piece, the pin engaging in a slot 12 in the skirt 9. The slot 13 between the knife edges of the parts 5 is again in the plane of triangulation of the rangefinder.

Figure 3:
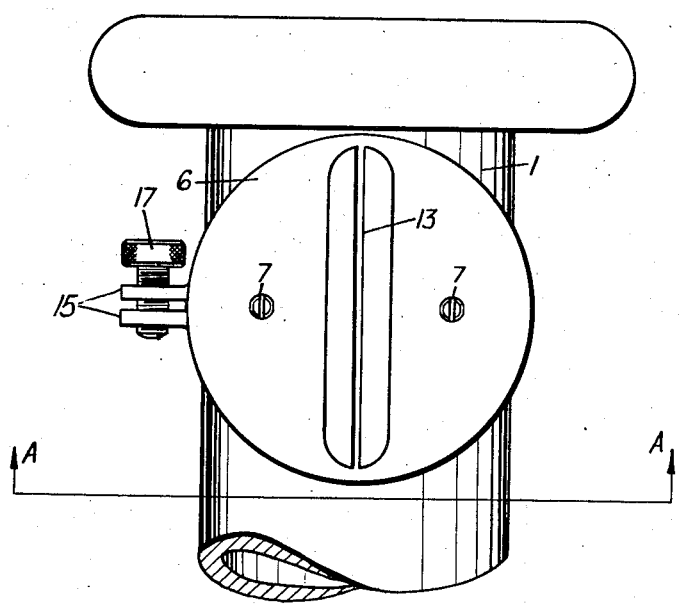
FIG. 3 is an elevation of part of a rangefinder having an alternative type of window cap with a slotted screen.

In FIGS. 3 and 3A the end cap 6 is similar to that shown in FIG. 2. In this case, however, the skirt portion is slotted laterally at 14 and lugs 15 are formed on the ends of parts 16 of the skirt. A milled screw 17 acts to draw together lugs 15 and so clamp the end cap onto the window piece 8.

In FIG. 4 a screen 18 is pivotally mounted at 19 to the end of rangefinder 1. The screen 18 is shown in the out-of-use position in full lines where it is housed in a protective shield 41, and can be moved in the direction of arrow 20 to the in-use position 18', shown in broken lines adjacent the window piece 8.

FIG. 5 shows a slotted screen 21 pivotally mounted at 22 inside a rangefinder 1 adjacent the reflector 23 for incoming rays. The screen 21 is shown in full lines in the in-use position and can be pivoted to the out-of-use position 21', shown in broken lines, by means of rod 24. The rod 24 is movable conveniently by the operator's hand and is connected to arm 25 which forms an extension of frame 21. It will be apparent that movement of the rod 24 in the direction of arrow 26 moves the screen in the direction of arrow 27.

FIGS. 6 and 6A show a screen device in which the slot 28 is adjustable, such adjustment allowing observation on the sun as its brightness varies. In this arrangement the screen comprises a fixed knife-edged plate 29 and a movable knife-edged plate 30, both housed between cover plates 42 which are removed in FIG. 6. Plate 30 is urged away from plate 29 by means of a spring 31 which acts between the plate 30 and a fixed rivet 32. Movement of the plate 30 is effected by rotation of ring 33 which is formed with a pair of similar internal cam surfaces 34 engaging projections 35 formed on the plate 30. Rotation of the ring in the direction of arrow 36 reduces the size of the slot 28, and vice versa.

In FIG. 7 is shown an image of the sun as seen through a rangefinder not provided with a slotted screen. It is apparent that some difficulty may be encountered in aligning two semi- or part-circular images such as 37. In FIG. 7A, however, slotted screens are provided and thus the image of the sun is elongated at right angles to the separation line to present two parts 38 which have parallel vertical sides and are easy to align accurately.

FIGS. 8 and 8A illustrate the advantage of a rangefinder provided with slotted screens from one without such screens when an error in "halving" exists. Such an error is incurred when the two images are not vertically aligned. As shown in FIG. 8, such a want of vertical alignment may cause serious errors in the measurement of the range. If the observer brings into coincidence either of the edges of the image, the setting will be incorrect. If, on the other hand, he attempts to use both edges simultaneously and to set by estimation of symmetry, a considerably less accurate setting will be obtained than with a true coincidence setting.

These troubles disappear when the slotted screens are provided because, as shown in FIG. 8A, the image of the sun has vertical sides and errors of vertical alignment therefore do not cause an error in coincidence setting.

I claim:

1. In combination with a rangefinder of the single observer self-contained base type having a casing and a pair of light entrance windows, a distance scale checking means permitting observation and calibration against a distant high intensity luminous source, such as the sun, comprising light screening means mounted on the casing and associated with each of said windows to limit the amount of light passing therethrough, said light screening means each being substantially opaque but having a single narrow, substantially parallel-sided slot therein formed between two knife edges, said slot having a width lying in the range between approximately one ten thousandth of an inch and approximately twenty-five thousandths of an inch, said slots being arranged substantially parallel to the plane of triangulation of the rangefinder, said screening means serving to attenuate the brightness of said source by reason of their opacity and to elongate the image of said source, whereby taking of measurements is facilitated by elongation of said image of said source due to the effect of diffraction on the edges of the slots.

2. A device according to claim 1, in which means are provided for adjusting the width of the slots in the screening means.

3. A device according to claim 1, in which the screening means are detachably mounted on the casing.

4. A device according to claim 1 having the screening means mounted for movement into and out of the operative positions.

5. A device according to claim 4 having means for moving the screening means including mechanism controlled from an operating lever situated conveniently to the observer's hand.

6. In combination with a rangefinder of the single observer self-contained base type having a casing and a pair of light entrance windows, a distance scale checking means permitting observation and calibration against a distant high intensity luminous source, such as the sun, comprising light screening means mounted on the casing and associated with each of said windows to limit the amount of light passing therethrough, said light screening means each being substantially opaque but having a single narrow, substantially parallel-sided slot therein, of width lying in the range between approximately one ten thousandth of an inch and approximately twenty-five thousandths of an inch, said slots being arranged substantially parallel to the plane of triangulation of the rangefinder, said screening means serving to attenuate the brightness of said source by reason of their opacity and to elongate the image of said source, whereby taking of measurements is facilitated by elongation of said image of said source due to the effect of diffraction on the edges of the slots.

7. A device according to claim 6 in which means are provided for adjusting the width of the slots in the screening means.

References Cited in the file of this patent

UNITED STATES PATENTS

| 1,233,908 | Richardson | July 17, 1917 |
| 1,605,418 | Wittkopf | Nov. 2, 1926 |

FOREIGN PATENTS

| 26,648 | Great Britain | of 1913 |

OTHER REFERENCES

"Fundamentals of Optical Engineering," McGraw-Hill Book Co., Inc., copyright 1943, page 270, paragraph entitled "Astigmatizers" (Jacobs).

"Fundamentals of Optics," second edition, McGraw-Hill Book Co., Inc., New York, 1950, pages 3, 4, 225–227, 279–285 (Jenkins and White).